United States Patent [19]

Brown

[11] Patent Number: 5,511,643

[45] Date of Patent: Apr. 30, 1996

[54] VISCOUS FLUID COUPLING AND IMPROVED FLUXRING FOR USE THEREIN

[75] Inventor: Richard J. Brown, Marshall, Mich.

[73] Assignee: Eaton Corporation, Cleveland, Ohio

[21] Appl. No.: 290,265

[22] Filed: Aug. 15, 1994

[51] Int. Cl.⁶ .................................................... F16D 35/02
[52] U.S. Cl. ...................... 192/58.61; 192/58.63; 192/82 T
[58] Field of Search ................ 192/58 B, 82 T, 192/58.61, 58.6, 58.63

[56] References Cited

U.S. PATENT DOCUMENTS

| 5,030,865 | 7/1991 | Rockey et al. | 192/58 B X |
| 5,152,383 | 10/1992 | Boyer et al. | 192/58 B |

*Primary Examiner*—Richard M. Lorence
*Attorney, Agent, or Firm*—L. J. Kasper

[57] ABSTRACT

A fluid coupling device is disclosed including a cover member (11) and an actuator assembly (35) disposed adjacent thereto for actuating a valve member (31). The cover includes an annular fluxring (49), which may be cast into the cover (11) and defines a radially inner surface (57). Extending radially inward from the surface (57) is an annular dovetail portion (59) defining radially outer surfaces (61,63). The cover member includes a cast central portion (55) disposed radially inward of the fluxring (49). As the cast central portion (55) cools, subsequent to casting, it shrinks and seals against the outer surfaces (61,63) of the dovetail (59), because the cover member (11) has a coefficient of thermal contraction which is greater than that of the fluxring (49), thus eliminating the formation of radial clearances between the cast central portion (55) and the inner surface (57) of the fluxring (49).

10 Claims, 2 Drawing Sheets

5,511,643

VISCOUS FLUID COUPLING AND IMPROVED FLUXRING FOR USE THEREIN

BACKGROUND OF THE DISCLOSURE

The present invention relates to viscous fluid couplings, and more particularly, to such couplings which are used to drive vehicle radiator cooling fans, wherein the engagement or disengagement of the coupling is controlled in response to a remotely sensed condition, such as coolant temperature.

In a typical viscous fluid coupling (viscous fan drive) of the type to which the present invention applies, an input shaft drives an input coupling member (clutch) which is received within an output coupling assembly (typically, comprising a body and cover) and torque is transmitted from the input to the output, in the presence of viscous fluid, by means of viscous shear drag. The coupling normally includes some sort of valving which controls the amount of viscous fluid within a viscous shear space, and therefore, controls the output torque and speed. Typically, the valving comprises a valve member which is moveable to cover or uncover a fill opening disposed between a reservoir chamber and an operating chamber (viscous shear space).

U.S. Pat. No. 5,152,383, assigned to the assignee of the present invention and incorporated herein by reference discloses a fluid coupling device including an electromagnetic actuator assembly mounted adjacent the cover of the coupling. Cast within the non-ferromagnetic cover of the coupling is a ferromagnetic fluxring, including a plurality of pole pieces, and attached to the rotatable valve member is an armature including a plurality of armature segments. Upon energization of the electromagnetic actuator, a magnetic flux is transmitted through the fluxring and pole pieces and rotates the armature and valve member, for example, from a closed position (coupling disengaged) to an open position (coupling engaged).

In the commercial product being developed by the assignee of the present invention, to be made in accordance with the above-cited patent, the fluxring comprises steel, and the cover member is an aluminum die casting, as is typical in viscous fan drives. Among the various tests performed on prototype samples of the coupling being developed is an air pressure test, to be described in greater detail subsequently. The purpose of the test is to simulate, on an accelerated basis, fluid pressure within the coupling. In connection with such testing, it was determined that there was a substantial problem with leakage occurring between the inside diameter of the fluxring, and the adjacent surface of that portion of the aluminum cover disposed radially inward from the fluxring. It was subsequently observed that the leakage was not the result of porosity in the aluminum die casting, but instead, was the result of a radial clearance disposed between the inside diameter of the fluxring and the adjacent surface of the cover.

SUMMARY OF THE INVENTION

Accordingly, it is an object of the present invention to provide an improved viscous fluid coupling of the type described above, including some sort of ferromagnetic ring, in which it is possible to substantially eliminate clearances, and the resulting leakage between the ring and the adjacent surface of the cover.

The above and other objects of the invention are accomplished by the provision of an improved fluid coupling device of the type including a first rotatable coupling assembly defining an axis of rotation, the first coupling assembly including a first coupling member and a cover member cooperating to define a fluid chamber therebetween. Valve means is associated with the first coupling assembly and separates the fluid chamber into a fluid operating chamber and a fluid reservoir chamber. A second rotatable coupling member is disposed in the fluid operating chamber and is rotatable relative to the first coupling member, the first coupling assembly cooperating with the second coupling member to define a viscous shear space therebetween. The valve means is operable to control the flow of fluid between the reservoir chamber and the operating chamber and the device includes means operable to pump fluid from the operating chamber into the reservoir chamber. The valve means defines a fluid inlet port and a valve member moveable between an open position permitting fluid flow through the inlet port, and a closed position substantially blocking fluid flow through the inlet port. An actuator assembly is operable associated with the first coupling assembly and with the valve means, and is operable to move the valve member toward one of the open and closed positions in response to an input. The cover member comprises a non-ferromagnetic member, and includes an annular ferromagnetic member disposed within the cover member and being generally concentric about the axis of rotation and operable to transmit the input from the actuator assembly to the valve means.

The improved fluid coupling device is characterized by the annular ferromagnetic member defining a radially inner surface, and extending radially inward therefrom, an annular dovetail portion. The dovetail portion defines at least one radially outer surface and the cover member includes a cast central portion disposed radially inwardly of the annular ferromagnetic member, the cast central portion being disposed in sealing engagement with the radially outer surface of the dovetail portion.

In accordance with a more limited aspect of the present invention, the improved fluid coupling device is characterized by the cast central portion of the cover member comprising a material which shrinks upon cooling subsequent to casting, the shrinkage of the cast central portion effecting the sealing engagement with the radially outer surface of the dovetail portion.

DESCRIPTION OF THE PREFERRED EMBODIMENT

Figure 1:
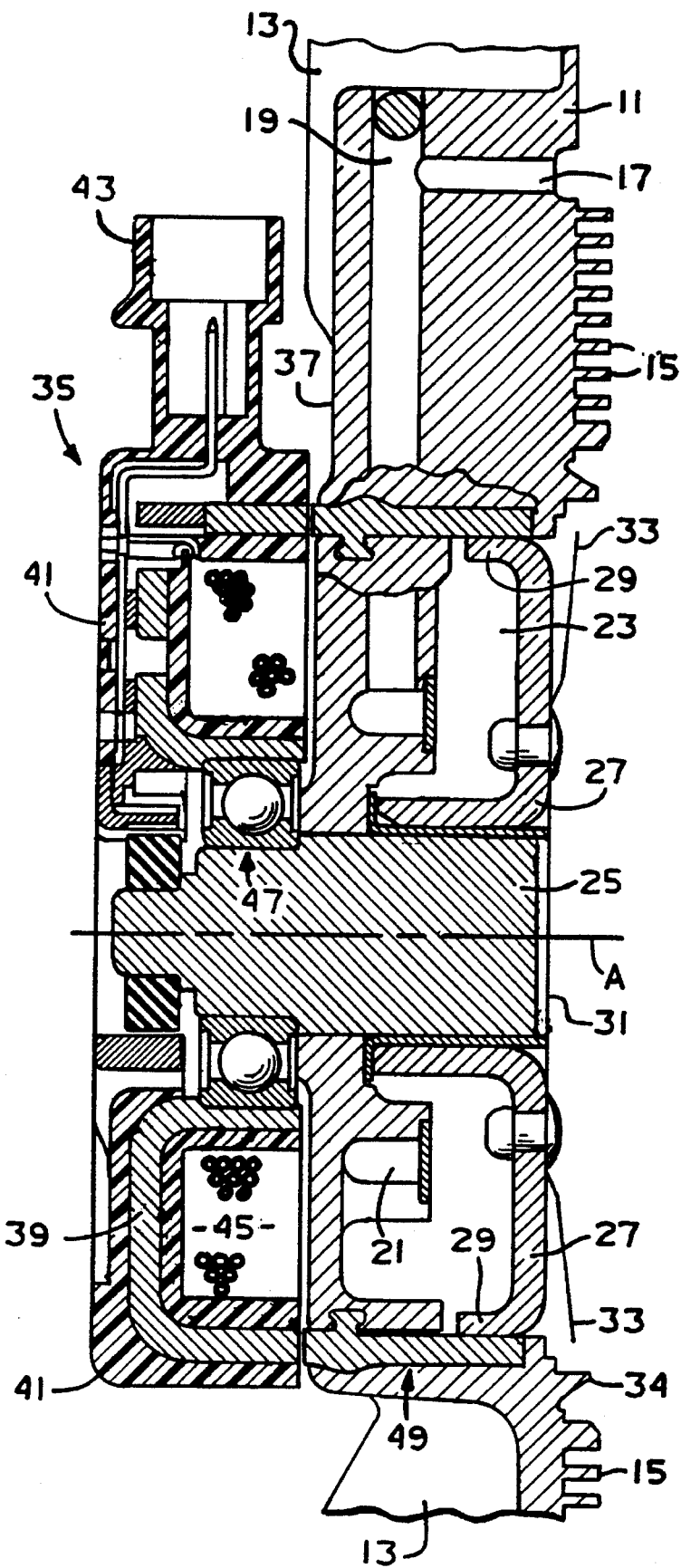
FIG. 1 is a fragmentary, axial cross-section of a cover subassembly, for a viscous fluid coupling, the cover subassembly being made in accordance with the teachings of the present invention.

Referring now to the drawings, which are not intended to limit the invention, FIG. 1 illustrates a preferred form of a cover subassembly for use with the viscous fluid coupling illustrated and described in above-incorporated U.S. Pat. No. 5,152,383. However, it should be understood that the present invention is not limited to any particular configuration of viscous fluid coupling, or to any particular configuration of cover or actuator or valving, except as specifically recited in the appended claims.

Referring first to FIG. 1, the cover subassembly includes a cast cover member 11 which includes, toward its front (to the left in FIG. 1) and extending around its outside diameter, a plurality of cooling fins 13. The rearward surface of the cover member 11 defines a plurality of annular lands 15, defining annular grooves therebetween.

The outer periphery of the cover member 11 is adapted for attachment to an outer periphery of a body member (not shown herein). Disposed between the body member and the cover member 11 is a clutch member rotatably driven by an input shaft (neither of which is shown herein) and as is well known to those skilled in the art, the clutch member defines a plurality of annular lands which are interdigitated with the annular lands 15 to define therebetween a viscous shear space. When the viscous shear space is filled with viscous fluid, torque is transmitted from the clutch member to the "output", comprising the assembly of the body member and the cover member 11. Those elements referenced above, but not illustrated in FIG. 1 are illustrated and described in the above-incorporated U.S. Pat. No. 5,152,383, but do not form an essential part of the present invention and will not be described further herein.

Referring still to FIG. 1, the cover member 11 defines an axial passage 17 opening into a radially-extending return passage 19. The passage 19 terminates, at its radially inner end, in an annular groove 21. By means of the passages 17 and 19 and the groove 21, fluid is pumped out of the shear space and back into a reservoir chamber 23 in response to a difference in the rotational speeds of the clutch member and the cover member 11, in a manner which is well known to those skilled in the art.

In the subject embodiment, the cover member 11 is an aluminum die casting which is preferably cast in place about a shaft member 25 which defines an axis of rotation A, corresponding to the axis of rotation of the entire coupling device. Disposed about the rearward end of the shaft member 25, and relatively rotatable thereto, is an armature member 27 including a plurality of axially-extending armature segments 29. A relatively thin, flat valve member 31 is riveted to the rearward surface of the armature member 27, the valve member 31 including a pair of radially outward port covering portions 33 which are disposed to cover their respective fill openings defined by a valve plate (not shown in FIG. 1). Typically, the valve plate is attached to the cover member 11 by means of a rollover portion 34, in a manner commonly utilized in commercially available viscous fan drives.

The rotational position of the armature member 27 and valve member 31 is determined by an actuator assembly, generally designated 35, which is seated on a forward end of the shaft member 25, and disposed adjacent a forward surface 37 of the cover member 11. The actuator assembly 35 may be referred to as providing "remote sensing" control, because the actuator 35 is responsive to a signal, such as a electrical input signal, transmitted from a remote location at which changes in a predetermined condition are occurring and are being sensed. The changes in the predetermined condition are represented by changes in the input signal transmitted to the actuator 35. Typically the predetermined condition being sensed is the temperature of the liquid coolant in the vehicle engine block (with the temperature measurement actually being made, typically, in the radiator "top tank").

The assembly 35 is referred to as an "actuator" assembly because it accomplishes the actuation of the armature 27 and the valve member 31. The actuator assembly 35 is intended to be tethered and therefore, basically stationary, with the shaft 25 in the remainder of the fluid coupling device rotating relative thereto.

The actuator 35 comprises a generally annular ferromagnetic housing member 39 which is preferably insert molded into a plastic housing 41. The plastic housing 41 includes an integrally molded electrical connector portion 43, which is adapted to be plugged into a suitable mating electrical connector (not shown) which, as is well known to those skilled in the art, may be part of a tether assembly, attached relative to a stationary object such as the vehicle chassis or fan shroud (neither of which is shown herein). Disposed within the tether assembly would be the appropriate electrical conductors to communicate input signals to the actuator assembly 35.

Referring still to FIG. 1, the housing member 39 is generally C-shaped in axial section, to accommodate therein an electromagnetic coil 45 which, as is well known to those skilled in the art, is typically wound on a plastic bobbin (not shown herein). The housing member 39 is in engagement with an outer race of a ball bearing set 47, the inner race of which is disposed about a reduced diameter portion of the shaft member 25.

Figure 2:
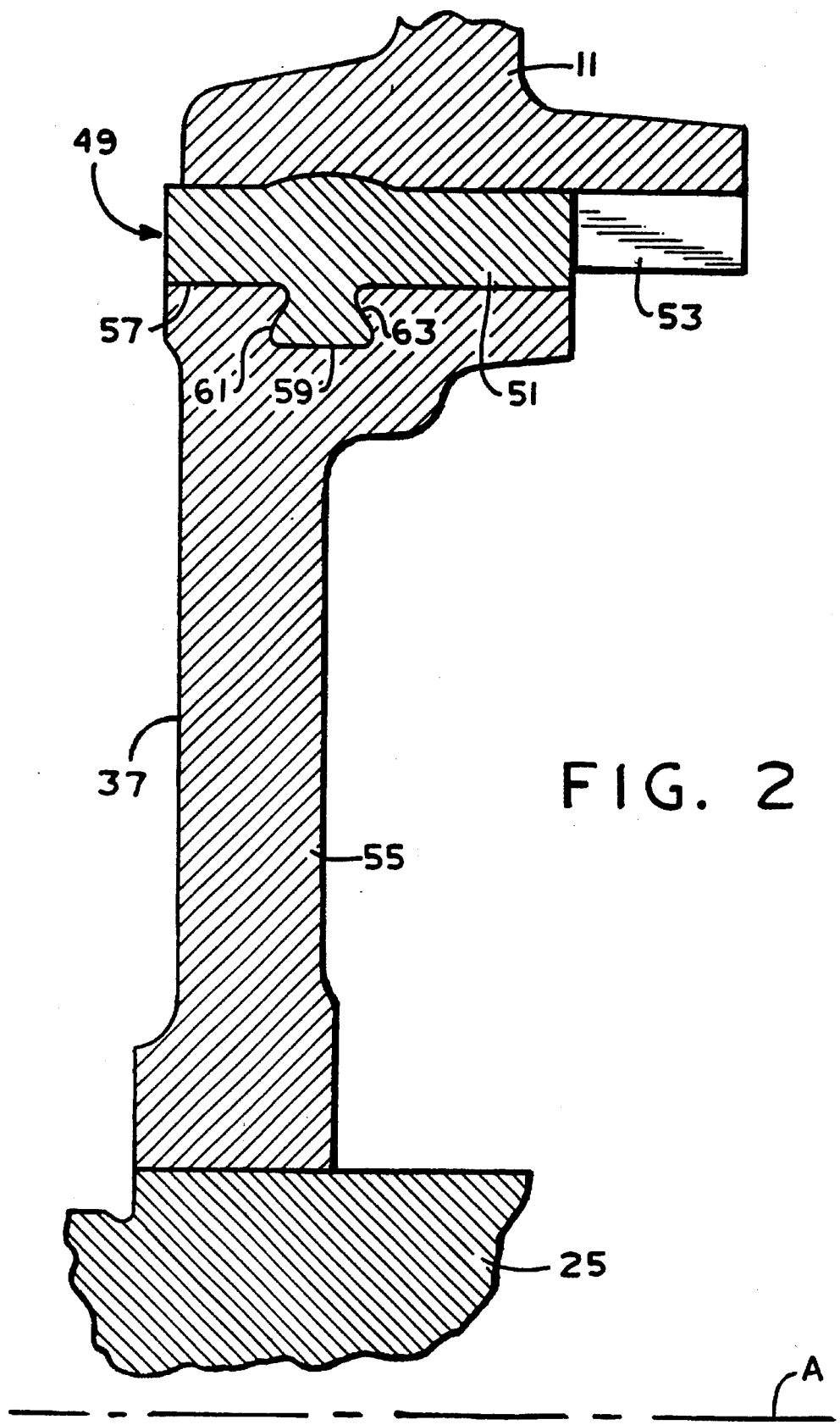
FIG. 2 is a further enlarged, fragmentary axial cross-section of the cover member shown in FIG. 1, but taken on a different plane than FIG. 1.

Disposed within the cast cover member 11 is an annular fluxring, generally designated 49. Referring now to FIG. 2, in conjunction with FIG. 1, the fluxring 49 includes an annular portion 51, and extending rearwardly from the portion 51 is a plurality of pole pieces 53. As may be seen in FIG. 1, and as is explained in greater detail in above-incorporated U.S. 5,152,383, the radially inward surfaces of the pole pieces 53 comprise part of the outer surface of the reservoir chamber 23, and are closely spaced apart, radially, from outer surfaces of the armature segments 29.

Referring again primarily to FIG. 1, when the electromagnetic coil 45 is energized, an electromagnetic field is established which will be described only briefly herein, in view of the detailed teachings of the above-incorporated patent. The resulting flux path extends radially inwardly through the front portion of the ferromagnetic housing member 39, then extends radially inwardly through the ball bearing set 47, then axially to the right in FIG. 1 through the shaft member 25. Next, the flux path extends radially outwardly through the armature member 27 and is "concentrated" in the armature segments 29. The flux path then extends through the radial clearance between the armature segments 29 and the pole pieces 53, with the flux path then extending to the left in FIG. 1 through the annular portion 51 of the fluxring 49 and across the transverse clearance between the front of the fluxring 49 and the rear of the housing member 39. Finally, the flux path extends to the left in FIG. 1 through the radially outer portion of the housing member 39, thus completing the flux path, As is illustrated and described in the above-incorporated patent, changes in the condition being sensed (for example, an increasing fluid temperature in the top tank) results in an increase in current to the coil 45, thus increasing the strength of the electromagnetic flux path. This results in a greater torque being applied to the armature member 27, thus moving the armature and the valve member 31 toward a different operating position, for example, toward a more "open" fill port. However, in a number of vehicle applications, such as heavy duty trucks, the viscous fan drive operates in a "fail-safe" mode, i.e., the valve arm is normally biased toward the open (engaged) position, and an increasing torque is required to overcome the biasing spring and move the valve arm toward the closed (disengaged) position.

In such an application, a decreasing temperature in the top tank would result in an increasing current to the coil 45, and an increasing strength of the electromagnetic flux path.

Although the cover subassembly of the present invention has been described in connection with a preferred embodiment in which the fluxring 49 transmits an electromagnetic flux path as the "input" to the valve 31 (and the armature 27), it should be understood by those skilled in the art that the invention is not so limited. The fluxring 49 could comprise any type of ferromagnetic member, whether transmitting an electrical signal as the input, or an electromagnetic field as in the subject embodiment, or any other suitable "input" to the valve means of the fluid coupling device.

Referring now again to FIG. 2, in conjunction with FIG. 1, it should be noted that, although the cover member 11 is cast as a single, unitary member, with the fluxring 49 comprising an "insert" within the cast cover, the cast cover member 11 does include a central portion 55 which is somewhat isolated from the remainder of the cover member 11, in that the central portion 55 is surrounded about almost its entire periphery by the fluxring 49. As may best be seen in FIG. 2, and in accordance with an important aspect of the present invention, the annular portion 51 of the fluxring 49 defines a radially inner surface 57, and extending radially inward from the surface 57 is a dovetail shaped extension 59. In the subject embodiment, the dovetail 59 extends about the entire circumference of the annular portion 51, for reasons which will become apparent subsequently. The dovetail 59 defines a forward radially outer surface 61 and a rearward radially outer surface 63. In the subject embodiment, each of the surfaces 61 and 63 is oriented at an angle of approximately 60 degrees relative to the axis of rotation A, although the particular angular orientation is not critical to the present invention. In fact, the extension 59 is not required to have the configuration of a traditional "dovetail" shape, as long as the extension 59 is capable of accomplishing the function to be described subsequently. Therefore, as used hereinafter, the term "dovetail" or "dovetail-shaped" will be understood to mean and include not only a true dovetail, but other similar configurations which are capable of performing the function to be described.

It is believed that in most applications, the dovetail 59 may be used in the "as cast" condition, i.e., not requiring any machining of the forward and rearward radially outer surfaces 61 and 63, prior to inserting the fluxring 49 into the die in which the cover member 11 is cast.

As is well-known to those skilled in the art, aluminum has a greater coefficient of thermal contraction than does steel, or any of the typical alloys which would be used to make the fluxring 49. In other words, there will be a greater dimensional change, in the radial direction, in the aluminum central portion 55 than there will be in any portion of the fluxring 49, and the present invention takes advantage of that difference between the aluminum and the steel.

As was mentioned in the BACKGROUND OF THE DISCLOSURE, during the development of the viscous fan drive utilizing the cover subassembly shown in FIG. 1, leakage was observed as a recurring problem. It was ultimately determined that, as the aluminum cover member 11 cools, subsequent to the casting process, the central portion 55 also cools and shrinks, and in the devices leading up to the present invention, the shrinkage of the central portion 55 was resulting in a radial clearance forming between the outer surface of the central portion 55 and the inner surface 57 of the flux ring 49.

In accordance with the present invention, including the dovetail-shaped extension 59, as the aluminum central portion 55 cools and shrinks, there may still be a clearance formed radially between the outer surface of the central portion 55 and the inner surface 57. However, at the same time, the portion of the aluminum central portion 55, disposed radially outward from the radially outer surfaces 61 and 63, shrinks radially inward seating and sealing against the outer surfaces 61 and 63. It is probable that the extension 59 is even subjected to a tensile force, acting radially inward, as a result of the shrinkage of the central portion 55.

In order to test the cover subassembly shown in FIG. 1 for potential leakage, the following test procedure is utilized: The cover subassembly is seated against a fixture in a manner which ensures no air leakage around the outer periphery of the cover member 11. Next, the cover subassembly and fixture are together submerged in water, and the interior chamber defined between the cover and the fixture receives air pressure (typically 25 psi) from a source of air pressure associated with the fixture.

The "results" of the testing merely comprise a visual observation to determine whether or not air bubbles are formed in the water, at the junction of the fluxring 49 and the central portion 55. A batch of twenty-seven cover subassemblies had been produced and tested, prior to the present invention, and air bubbles were observed during the testing of all twenty-seven, indicating at least some leakage occurring in all twenty-seven. Subsequent to the development of the present invention, another batch of twenty-seven cover subassemblies was tested, and there were no air bubbles observed during the testing of any of the twenty-seven made with the present invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid coupling device of the type including a first rotatable coupling assembly defining an axis of rotation (A), said first coupling assembly including a first coupling member and a cover member cooperating to define a fluid chamber therebetween; valve means associated with said first coupling assembly and disposed to separate said fluid chamber into a fluid operating chamber and a fluid reservoir chamber; a second rotatable coupling member disposed in said fluid operating chamber and being rotatable relative to said first coupling member, said first coupling assembly cooperating with said second coupling member to define a viscous shear space therebetween; said valve means being operable to control the flow of fluid between said reservoir chamber and said operating chamber, and means operable to pump fluid from said operating chamber into said reservoir chamber; said valve means defining a fluid inlet port and a valve member being moveable between an open position permitting fluid flow through said inlet port, and a closed position substantially blocking fluid flow through said inlet port; and an actuator assembly operably associated with said first coupling assembly and with said valve means, and operable to move said valve member toward one of said open and closed positions in response to an input; said cover member comprising a nonferromagnetic member, and including an annular ferromagnetic member disposed within said cover member and being generally concentric about said axis of rotation (a), and operable to transmit said input from said actuator assembly to said valve means; characterized by:

(a) said annular ferromagnetic member defines a radially inner surface, and extending radially inward therefrom, an annular dovetail portion;

(b) said dovetail portion defining at least one radially outer surface; and (c) said cover member including a cast central portion disposed radially inwardly of said annular ferromagnetic member, said cast central portion being disposed in sealing engagement with said radially outer surface of said dovetail portion.

2. A fluid coupling device as claimed in claim 1, characterized by said cast central portion of said cover member comprising a material which shrinks upon cooling subsequent to casting, said shrinkage of said cast central portion effecting said sealing engagement with said radially outer surface of said dovetail portion.

3. A fluid coupling device as claimed in claim 2, characterized by said material comprising said cast central portion having a coefficient of thermal contraction, upon cooling subsequent to casting, which is greater than that of said annular ferromagnetic member.

4. A fluid coupling device as claimed in claim 3, characterized by said material comprises aluminum.

5. A fluid coupling device as claimed in claim 1, characterized by said dovetail portion defining forward and rearward radially outer surfaces, and said cast central portion is in sealing engagement with both of said forward (61) and rearward radially outer surfaces.

6. A fluid coupling device as claimed in claim 1, characterized by said valve means including a plate-like member disposed generally perpendicular to said axis of rotation (A) and defining said fluid inlet port.

7. A fluid coupling device as claimed in claim 6, characterized by said valve member comprising a generally flat member disposed to move in a plane parallel to said plate-like member, and closely spaced thereto.

8. A fluid coupling device as claimed in claim 7, characterized by said valve means, further including means biasing said valve member toward the other of said open and closed positions, in opposition to the force of said actuator assembly.

9. A fluid coupling device as claimed in claim 6, characterized by said annular ferromagnetic member comprises an electromagnetic fluxring including a plurality of electromagnetic pole pieces, and said valve means includes an armature member having a plurality of armature segments, each of said armature segments being disposed adjacent one of said electromagnetic pole pieces, and in operative association therewith.

10. A fluid coupling device as claimed in claim 9, characterized by said actuator assembly including a source of an electromagnetic field, said source being disposed in operative association with said electromagnetic fluxring.

* * * * *